United States Patent [19]
Majumdar et al.

[11] Patent Number: 5,840,138
[45] Date of Patent: Nov. 24, 1998

[54] WATERBORNE RADIAL FIRST HARMONIC MARKING OF TIRES

[75] Inventors: Ramendra Nath Majumdar, Hudson; Robert Calevich, Highland Heights, both of Ohio

[73] Assignee: The Goodyear Tire & Rubber Company, Akron, Ohio

[21] Appl. No.: 845,183

[22] Filed: Apr. 25, 1997

[51] Int. Cl.⁶ .................................................. B60C 13/00
[52] U.S. Cl. .................... 152/524; 152/450; 152/525; 156/67; 156/116
[58] Field of Search .................... 156/116, 67; 152/524, 152/154.1, 525, 450, 151, DIG. 12; 8/648; 427/157, 158

[56] References Cited

U.S. PATENT DOCUMENTS

| | | | |
|---|---|---|---|
| 3,607,498 | 9/1971 | Kubota | 156/116 |
| 4,911,218 | 3/1990 | Patitsas . | |
| 5,058,648 | 10/1991 | Kansupada | 156/116 |
| 5,149,519 | 9/1992 | Patitsas et al. . | |
| 5,547,499 | 8/1996 | Kawasami et al. | 106/20 R |

FOREIGN PATENT DOCUMENTS 750967  1/1967  Canada .

OTHER PUBLICATIONS

Article re "harmonics," p. 51, *Academic American Encyclopedia*, Arete Publishing Company, Inc., Princeton, NJ., Jan. 1, 1981.

Abstract of Japanese Patent Document JP 8104852A, Published Apr. 23, 1996, from Application JP 94308416, filed Nov. 18, 1994.

Article re "fluorescence," pp. 186–187, *Academic American Encyclopedia*, Arete Publishing Company, Inc., Princeton, NJ., Jan. 1, 1981.

Article re "Brighteners, fluorescent," in Kirk–Othmer *Encyclopedia of Chemical Technology*, Third Edition, vol. 4, pp. 213–226, John Wiley & Sons, New York, Jan. 1, 1978.

Trade literature, SICK Optic–Electronic, Inc., 4 pages, re "LUT 1–4 Luminescence Scanner," distributed by SICK Optic–Electronic, Eden Prairie, MN.

*Primary Examiner*—Geoffrey L. Knable
*Attorney, Agent, or Firm*—Samuel B Laferty; Henry C Young, Jr.

[57] ABSTRACT

Poly(vinyl alcohol) used in combination with a marking composition including a fluorescent pigment or dye can be used to identify the location of variations, e.g. radial variations, in a pneumatic tire so the tire can be precisely mixed and matched with other components such as tire rims which may have compensating radial variations. The fluorescent marking can include poly(vinyl alcohol) or alternatively be applied as another layer over a poly(vinyl alcohol) based protective coating in which case the fluorescent marking composition need not contain poly(vinyl alcohol).

20 Claims, No Drawings

WATERBORNE RADIAL FIRST HARMONIC MARKING OF TIRES

FIELD OF THE INVENTION

This invention relates to a water-based fluorescent marking composition for a pneumatic tire and to a tire marked with such composition. The marking composition includes a poly(vinyl alcohol) binder or is applied over a coating having a poly(vinyl alcohol) binder. The coating is desirably a water-removable marking. It identifies variations in the tire that can be compensated for by match mounting with a tire rim.

BACKGROUND

New tire sidewalls are often coated by the manufacturer with water-removable protective paints or coatings, particularly when the tire sidewalls having a color (e.g. white) which contrasts with the typical black colored remainder of the tire. These protective paints often include poly(vinyl alcohol) as a binder as taught in U.S. Pat. Nos. 4,911,218 and 5,149,591. The general purpose of such a protective coat or paint is to inhibit or prevent migration of chemicals to the decorative whitewall tire rubber composition from the surface of an adjacent black colored tire. These chemicals without the protective paint would tend to stain and, thus, discolor the whitewall rubber. Such contact staining phenomenon is well known.

Pneumatic tires are generally assembled from a multitude of plies, layers, cords, etc. The components are carefully assembled and adhered to each other on a tire assembly machine. The green tire is removed from the tire assembly machine and the rubber components are vulcanized in a tire curing press. The cured tire from the tire curing press is evaluated for dimensional variations, weight variations, variations from inflating the tire, and variations detectable as the tire is rotated. Tire manufacturers have measured and marked these detectable variations as part of their quality control programs. The data from these evaluations is used by the tire manufacturers to appropriately adjust their equipment and process.

Automobile manufacturers recognized that the tire manufacturer's marking of the location and extent of minor variations between tires could be used to compensatingly match the tire with variations in other automobile components such as the tire rim. They requested the markings be left on the tires to be shipped to them. Automobile manufacturers requested fluorescent markings be placed on the tire substrate because these could be mechanically read and matched by machines, such as those machines installing tires on rims. The commercially available fluorescent coating materials used in related applications needed organic solvents for their removal. Further, the solvent-based coatings did not retain sufficient fluorescence to be detected after aging. Organic solvents create environmental and worker's health hazard. Automobile manufacturers evaluated fluorescent labels including a fluorescent marking, a backing and a pressure sensitive adhesive. Besides higher manufacturing cost of the labels with pressure sensitive adhesive, additional cost was incurred because the labels and adhesive have to be manually removed and do not wash away during a normal car wash. Often, any protective paint or coating on the tire sidewall was removed prior to applying fluorescent markings or labels to improve adhesion.

The term harmonics relates to a variety of sinusoidal components that make up a musical tone. If the first frequency of a tone is 440 Hz then the second will generally be at 880 Hz and the third at 1320 Hz. A measurement of a pneumatic tire as it rotates one revolution can often be a sinusoid. If the measurement produces one minimum value and one maximum value per rotation it will have sinusoidal characteristics with a frequency of 1. Thus a marking of the first harmonic of a rotating tire usually indicates a minimum or maximum measured value on a sector of a tire for a particular test.

SUMMARY OF THE INVENTION

A process for marking at least one sector of a pneumatic tire with a water-based fluorescent marking is described. The resulting marked tire is also claimed. The process involves detecting a radial variation in at least one sector of the tire, applying a fluorescent marking to that sector [the marking being applied over a poly(vinyl alcohol) coating or including poly(vinyl alcohol) or both] and drying the fluorescent marking. The invention will be described with regard to a radial variation (i.e. offset tread portion) although it is to be understood it can also be applied to weight variations and the like. When mounting the tire on a rim the fluorescent mark can be detected, a marked tire rim can be selected, the tire is rotated with respect to a tire rim to minimize total deviation of the tire and rim, and the tire can be mounted on the rim. Subsequently, the fluorescent marking can be removed from the tire with water. The fluorescent marking can comprise a fluorescent pigment or dye if applied over a poly(vinyl alcohol) coating or can include the fluorescent pigment or dye, poly(vinyl alcohol) and a plasticizer.

DETAILED DESCRIPTION OF THE INVENTION

In accordance with this invention, the marking composition is comprised of at least one fluorescent pigment or dye if applied over a poly(vinyl alcohol) (PVA) coating or alternatively comprises at least one fluorescent pigment or dye and poly(vinyl alcohol).

In further accordance with this invention, a pneumatic tire is provided having one or more discrete markings of this invention desirably on at least one of its sidewalls.

There is a particular benefit in utilizing a poly(vinyl alcohol) based coating composition for marking at least one of the sidewalls of a rubber tire, preferably a pneumatic rubber tire. The poly(vinyl alcohol) provides a stain resistant polar binder that retains the fluorescent activity of the fluorescent pigment or dye for days and desirably for months.

In the practice of this invention, it is understood that the PVA coating generally includes a suitable plasticizer for the PVA, such as for example, glycerin, sorbitol, and/or other polyols which is typically used with the PVA in order to make the PVA more flexible. Poly(vinyl acetate) plasticization is also possible. Other PVA plasticizers include alkyl diaryl phosphates in small amounts and sulfonamides. While the choice of plasticizer may not be entirely critical, it should be a plasticizer which does not substantially degrade the resistance of the PVA to the migration of the staining materials from within the tire. For such purposes, glycerin and/or polyols are often used. However, if desired, the plasticizer can include a small amount of polyoxyalkylene, preferably a poly(ethylene glycol), with the amount used being commensurate with stain retardance desired. Such materials are relatively well known by those having skill in such art for such purpose. Typically the PVA coating is comprised about 10 to about 20 and up to about 30 parts by weight of the above plasticizer per 100 parts by weight of the PVA. Such coating composition is relatively well known to those skilled in such art.

The PVA may also include poly(vinyl acetate) in large amounts. For example, some water-removable coatings comprise from about 1 or 10 to about 90 or 99, and more desirably from about 50 or 75 to about 85 parts by weight of poly(vinyl acetate) and from about 1 or 10 to about 90 or 99 and more desirably from about 10 or 15 to about 25 or 50 parts by weight of poly(vinyl alcohol). Thus, poly(vinyl acetate) can be present in amounts from about 1 to about 900 parts by weight per 100 parts by weight of poly(vinyl alcohol). Although polyvinyl acetate) is not considered water-soluble, it is water-dispersible especially when blended with poly(vinyl alcohol). The poly(vinyl acetate) can be used in higher amounts than other plasticizers as it acts as a binder and flexibilizes the poly(vinyl alcohol). The poly(vinyl acetate) is a fairly polar polymer (many small ester repeat units) and can act as a barrier to keep migratable compounds from deactivating the fluorescent material.

Thus, in accordance with this invention, a cured rubber tire is provided having at least one of its surfaces marked with the fluorescent composition of this invention, either as a single layer marking or a laminate of 1 or more layers forming a fluorescent marking retaining fluorescent activity after aging.

The poly(vinyl alcohol) can generally be described as being about an 80 to 99.5 percent hydrolyzed poly(vinyl acetate) (PVAc). Thus the PVA, as it would be understood by those having skill in the art, contains a small amount, e.g. about 0.5 to about 20 percent unhydrolyzed repeat units from vinyl acetate, e.g., it is a poly(vinyl alcohol-co-vinyl acetate) although it is still conventionally referred to (as it is here) as poly(vinyl alcohol) (PVA). It usually has a number average molecular weight in the range of about 20,000 to about 250,000 and preferably in the range from about 84,000 to about 110,000. Although these values are not considered critical, they are desirable. Sometimes a molecular weight in the lower range is used for the PVA if a more flexible or pliable coating is desired. Other water-soluble or water-swellable polymers such as alkali metal-carboxymethyl-cellulose and xanthan gum can be used alone or in combination with the poly(vinyl alcohol). The poly(vinyl alcohol) is desirably at least 5, 10, 15 or 20 weight percent, more desirably at least 30, 40 or 50 and preferably at least 65 weight percent of the dried marking or of a water-removable dried coating between said fluorescent marking and said tire. Desirably, poly(vinyl acetate) is at least 10, 20, 30, or 40 weight percent of said dry coating(s) when the poly(vinyl alcohol) is present in amounts less than 30 weight percent of said dried coating.

The poly(vinyl acetate) can vary widely in composition and molecular weight as it is added to soften the poly(vinyl alcohol) so it is more resistant to cracking. The poly(vinyl acetate) can include other monomers in small amounts, e.g., desirably less than 50 weight percent of other monomers and more desirably less than 10 or 20 weight percent of monomers other than vinyl acetate. Vinyl acetate is known to be copolymerizable with the monomers such as ethylene.

While in an embodiment the poly(vinyl alcohol) is a primary binder for the fluorescent marking, the poly(vinyl alcohol) need not be a part of the water-based marking composition. A previously applied poly(vinyl alcohol) coating or coating comprising a blend of poly(vinyl alcohol) and a plasticizer such as poly(vinyl acetate) (such as the one used to protect tire whitewalls during storage) can protect a fluorescent marking composition from the migrating chemicals in the tire. Thus, a long lasting fluorescent marking can comprise a poly(vinyl alcohol) coating and a water-based fluorescent composition either as a one component or a two or more layer marking.

The fluorescent pigment or dye is desirably used in an amount from about 1 to about 50 parts by weight per 100 parts by weight of the dried marking composition and more desirably from about 1 to about 40. Preferably the amount of fluorescent pigment or dye is from about 1 to about 30 parts by weight. Fluorescence is defined as a material that can emit light when excited by another energy source, e.g., radiation. This is different than reflecting light. Typically many fluorescent materials absorb ultra violet light (a high frequency, high energy light) and re-emit visible light (lower in frequency). It is differentiated from phosphorescence in that the fluorescence is re-emitted in a short time, (e.g., about $10^{-8}$ second or less after excitation) after the incident light is removed. In phosphorescence the energy is readmitted for longer periods of time after the excitation. Minerals often exhibit fluorescence. Electron bombardment can also serve as an energy source to induce fluorescent emissions of light. This technology is used in television screens.

The fluorescent pigment or dye can include Rhodamine which is an organic dye that exhibits fluorescent emissions. Fluorescence can also be obtained from fluorescent mineral material such as fluorite. Other minerals that display fluorescence are autunite, calcite, hyalite, scapolite, scheelite and willemite. The amount of fluorescence and color of fluorescence are highly dependent upon the presence of certain chemical elements. Thus, slight variations in composition can change the amount of fluorescence or the perceived color of fluorescence of a fluorescent pigment or dye.

As set forth in the examples, the fluorescent materials are available as powders and as water-based dispersions. They are commercially available from sources such as Day-Glo Color Corporation in Cleveland, Ohio. The preferred fluorescent materials are primarily fluorescent material and optionally water or solvent and often include minor amounts of a dispersant and a binder. These type of products are designed to be formulated with polymer solutions or dispersions if binders are necessary. Thus, the fluorescent compositions of this disclosure desirably have less than 50 weight percent, based on the dried coating weight of binders other than poly(vinyl alcohol) and poly(vinyl acetate). As shown in Table II other binders can be used over a poly(vinyl alcohol) based layer but it is preferred to use a poly(vinyl alcohol) based binder or to apply the fluorescent material as a dispersion with very little binder onto a poly(vinyl alcohol) based coating.

The fluorescent marking composition may include fluorescent brighteners (optical brightening agents) such as Uvitex™ OB used in Table II and thereafter. It is available from Ciba-Geigy Corporation, in Ardsley, N.Y. Uvitex™ OB is in the chemical family of bis(benzoxazolyl) derivatives. Some brighteners such as Tinopal™ SFP from Ciba-Geigy Corporation (a stilbene-2,2'-disulphonic acid class brightener) can be the fluorescent pigment or dye as shown in the last table of the application. Other fluorescent brighteners are described in the Kirk-Othmer Encyclopedia of Chemical Technology, Vol. 4, 3rd Edition, published by John Wiley & Sons copyright 1978, pp. 213–226.

Fillers including talc, mica, silica, $TiO_2$, etc. can be used in the poly(vinyl alcohol) coating or the fluorescent marking composition as long as they do not reduce the amount of fluorescence below the required amount needed for detection of the marking, e.g. currently 30 Sick units from 3 inches away. Fillers like talc and mica may prevent migration of staining compounds from the tire from entering and discoloring or deactivating the fluorescence of the fluorescent coating. Fillers can be used in an amount from about 1 to about 200 parts by weight per 100 parts by weight of a dried coating or dried marking. In some embodiments it will be desired to have less fillers as they may absorb some of the source radiation, or the fluorescent emission from the coating, decreasing the amount of fluorescent light emitted by the coating.

Other polymers may be used in the marking composition. Other suitable water-dispersible binders are described in other patents such U.S. Pat. No. 5,149,591 hereby incorporated by reference. That patent describes water-insoluble polyurethanes that increase the humidity tolerance of the coating composition. Generally, urethanes are the reaction product one or more polyisocyanates and one or more hydroxyl terminated intermediates. Intermediates can be almost any hydroxyl terminated polymer, but polyethers and polyesters are commonly used. The intermediates typically have a number average molecular weight from about 700 to about 25,000. Water-dispersible polyurethanes may be used in amounts from about 2 to about 30 parts by weight per 100 parts by weight of poly(vinyl alcohol) or of poly(vinyl alcohol) and poly(vinyl acetate) if poly(vinyl acetate) is present. More desirably the polyurethanes are used in amounts from about 3 to about 25 parts by weight and preferably from about 4 to about 20 parts by weight. Water-dispersible polyurethane compositions are well known to the art and are commercially available.

The marking composition is desirably comprised of a fluorescent pigment or dye, a binder, and optionally fillers, plasticizers and antidegradants. Desirably, at least 25, 50 or 75 weight percent of the binder is poly(vinyl alcohol) in a preferred embodiment. The plasticizer is added to increase the flexibility of the coating composition. Biocides are useful to prevent microbial activity in the water-based marking composition and films therefrom. A preferred biocide is GIV-GARD DXN™ from Givaudan-Roure Corporation in Teaneck, N.J. The antidegradants are added to maintain the integrity of the coating during aging. Certain antidegradants are UV light absorbers and may be undesirable in this composition due to their effect on decreasing fluorescence.

The fluorescent marking composition is desirably a water-based marking composition. Further it is desirable that the marking composition become a film that is readily water-soluble so that it can be removed by water or soap and water washing procedure or with a high pressure water spray with or without a soap or surfactant. For this reason, desirably the binder in the coating composition is poly(vinyl alcohol) or a similar material.

Desirably the fluorescent marking retains enough fluorescent (e.g. about 30 Sick units or more at 3" (7.6 cm) or more) to be read by a fluorescence detector (e.g. one using a light source and a receiver such as the LUT 1–4) after 4 or 8 months aging as a dried coating at 25°±5° C., and more desirably it retains enough fluorescence for 12 or 16 months or more under the same conditions.

The poly(vinyl alcohol) can be dispersed in cold water, e.g., 16° C. and then the poly(vinyl alcohol) and water dispersion can be heated to 82° C. with agitation to form a homogenous solution. This procedure and these temperatures are not critical to the invention but facilitate the preparation of poly(vinyl alcohol) dispersion. After the poly(vinyl alcohol) is in the water the other additives such as the fluorescent pigment or dye, fillers, antioxidants, antiozonants, biocides and plasticizers can be added individually or together. Alternatively, these additives could be added to the water and then the poly(vinyl alcohol) added and dispersed. Wetting agents such as surfactants and dispersants can also be added to facilitate the interaction of the non-soluble materials with the water or to facilitate the interaction of the coating with a tire. The amount of surfactants and dispersants may also have an effect on the ease with which the fluorescent coating is removed from the assembled wheel assembly.

When the binder of the fluorescent marking or of a protective paint or coating is to be a blend of poly(vinyl alcohol) and poly(vinyl acetate) it may be desirable to blend the poly(vinyl alcohol) and poly(vinyl acetate) and optionally other components, then disperse the blend thereof in water and add the rest of the optional components. Dispersants may be added. The poly(vinyl alcohol) will act as a dispersant. Such water-based dispersions of poly(vinyl alcohol) and poly(vinyl acetate) are known to the arts.

The fluorescent marking is applied to a tire. A tire generally comprises a casing, two side walls, and a tread region. A major component of the tire is a carbon black filled vulcanized rubber composition typically including an oil extender, antioxidants, and antiozonants. The antioxidants and antiozonants are often staining compounds such as amines, e.g., aromatic amines and phenolic compounds. These antioxidants and antiozonants are known to migrate within the tire and from the tire. They can stain materials which they come in contact with for long periods of time and they seem to have an effect of reducing the fluorescence of fluorescent paints.

If the tire has a white sidewall then it may have a protective coating or paint, e.g., a poly(vinyl alcohol) coating on the whitewall to prevent staining materials from staining the whitewall during storage in a tire warehouse. The fluorescent marking can be applied directly over these types of coatings or paints. As the fluorescent markings taught herein are relatively polar, there is no need to remove the protective coating or paint to achieve good adhesions as was generally practiced in the past. Since the paint already has PVA the fluorescent marking need not have PVA.

Pneumatic tires are typically manufactured from a wide variety of components. The particular components and the raw materials for the components are selected based upon the type of tire, e.g. aircraft tire, truck tire, passenger tire, etc. The materials used include high modulus fibers, wires, etc. precisely arranged within the rubber matrix. The rubber matrix is initially uncured so that it is deformable and shapable during the preparation of the components and the assembly of the tire. Subsequent to final assembly of the tire the rubber matrix is crosslinked as a final step in the tire manufacturing process.

Crosslinking of the tires is generally accomplished with a tire curing machine. The tire curing machine for an automobile tire generally comprises a multi-section mold for the exterior of the tire and an inflatable bladder that presses the green uncured tire into the metal mold for the exterior of the tire. Often both the metal mold and the inflatable bladder are heated with a fluid such as steam to speed the tire curing process.

After curing the tire it is evaluated in various machines such as a force machine. The use of the force machine and other equipment is to assure that the tire has the correct size, shape, weight, uniformity, etc. Besides being a final quality check these measurements can be used to adjust or modify the tire building machine (tire assembly machine), tire curing machine (press), and the size, shape and composition of the components to the tire.

The force machine and related equipment can detect variations between sectors of the tire that are too small to substantially effect performance and which are acceptable to the final consumer. Similar variations occur in other portions of a wheel assembly such as the rim, hubcap, bearings, brake rotor, etc. If all of the wheel components are randomly assembled, then some of the wheels will be assembled with the variations in the components aggregating to make the wheel more out of round, out of balance, etc. than any of the individual wheel components. Realizing this, wheel assemblers are interested in having the wheel component manufacturers identify detectable variations so that some wheel components, such as the tire and the rim, can be selectively rotated with respect to each other. By doing this the aggregate variation of the assembly of two or more components is less than the largest variation in a single component. This is called mixing and matching the variations or match mounting in the case of a tire and a rim. These mixing and matching procedures make for a more uniform wheel assembly.

The fluorescent marking has utility to mark rubber articles containing additives that detract from the fluorescent properties after aging. The tires marked with the fluorescent marking have utility as a component of a wheel assembly that can be compensatingly assembled to minimize the total variation between sectors of the wheel assembly.

The advantages of this invention are more particularly shown by the following example in which the parts and percentages are by weight unless otherwise indicated.

EXAMPLES
Fluorescence Measurements

Fluorescent labels (including a fluorescent coating, a backing material and an adhesive) and fluorescent markings were applied onto cured 6"×6"×0.025" (15.2×15.2×0.064 cm) tire sidewall compound. A protective mylar film was peeled off the cured sidewall compound just before application of harmonic labels/markings. Two control adhesive backed labels from MPI Label Systems in Sebring, Ohio and Bollin Label Systems in Toledo, Ohio were applied. Also two commercial markings (DPI-613 and DPI-614) from Dell Marking Systems Inc. in Ferndale, Mich. were applied. One commercial marking was solvent based and one was water-based. DPI-613 is an organic solvent-based fluorescent green ink. DPI-614 is a water-based fluorescent light green ink. As shown in Table I, the water-based Dell marking does not retain fluorescence as do the examples of the invention. This difference in aged fluorescence is attributed to the binders used therein.

Examples A and B were poly(vinyl alcohol) based formulations. Example A was 22.8 g of Spraylat™ ZR5576 a poly(vinyl alcohol)/poly(vinyl acetate) protective coating for tire sidewalls available from Spraylat Corporation, Mt. Vernon, N.Y., and 15.2 g of EPX 13 (Glo-Sperse Rocket Red™ from Day-Glo Color Corporation, in Cleveland, Ohio). The binder in Spraylat™ is believed to be a blend of poly(vinyl alcohol) and poly(vinyl acetate) with more of the poly(vinyl acetate) on a weight basis. Example B was 33.1 g of Spraylat™ ZR5576 and 24 g of EPX 17 (Glo-Sperse Saturn Yellow™ from Day-Glo Color Corporation). Both the Spraylat™ and the fluorescent compounds are solutions or dispersions in water. The fluorescent solutions or dispersions typically contain at least one fluorescent compound and a resin. EPX 13 (Glo-Sperse Rocket Red) includes CI Basic Red, Potomac Yellow, and Sierra Yellow.

The water-based urethane fluorescent marking was 14.6 g of Sancure™ 776 and 14.6 g of EPX 13 (Glo-Sperse Rocket Red). Sancure™ 776 is an aliphatic waterborne urethane polymer from the B. F. Goodrich Company, in Brecksville, Ohio.

The markings were applied using a stick with an attached sponge. Fluorescence was measured in Sick units using Lut 1–4 Luminescence Scanner. The labels/markings were placed 3" from the lens of the equipment for fluorescence measurements. If values were greater than 100 Sick units then additional measurements were made from a longer distance (4" (10.2 cm) and/or 5" (12.7 cm)). Fluorescence values, measured on freshly applied labels/markings and again after 5 and 12 days of aging at room temperature (23°±2° C.), are shown in Table 1. At least one automobile manufacturer specified at least 30 Sick units from 3 inches away (7.6 cm) is needed for mechanized reading for match mounting of tires.

The fluorescence is easily measured with a fluorescence detector such as the LUT 1–4 luminescence scanner from SICK Optic-Electronic, Inc., Eden Prairie, Minn,. The LUT 1–4 emits modulated ultraviolet light (UV-A) at a wavelength of 365 nm. It responds to light of the same modulated frequency at 450 to 750 nm. According to the manufacturer the equipment is designed to detect luminescent substances which, when excited by UV-light, emit longer wavelength light and have decay time of approximately 10 μs. Fluorescent marks are detectable with this LUT equipment on almost any surface, including wood, rusted metal, and reflective foil.

The LUT 1–4 contains both a sender and a receiver. Its source is a high-pressure, modulated light. By using optical filters, only UV-light at 365 nm is transmitted through the lens to the scanned material. The receiver responds only to the light of the same modulated frequency (a wavelength of approximately 450 to 750 nm). Thus, the receiver is relatively insensitive to ambient light.

TABLE I

| | Fresh and Aged Fluorescence Values* in Sick Units | | | |
|---|---|---|---|---|
| Labels or Markings | After Aging | Fluorescence (Fresh) | Fluorescence (Aged 5 Days) | Fluorescence (Aged 12 Days) |
| MPI Label (Control) | Not Stained | >100, 96(4") | >100, 76(4") | >100, >100(4"), 52(5") |
| Bollin Label (Control) | Not Stained | >100, 74(4") | >100, 43(4") | >100, 75(4") |
| Dell's Solvent Based DPI-613 | Stained | 45 | 16 | 11 |

TABLE I-continued

Fresh and Aged Fluorescence Values* in Sick Units

| Labels or Markings | After Aging | Fluorescence (Fresh) | Fluorescence (Aged 5 Days) | Fluorescence (Aged 12 Days) |
|---|---|---|---|---|
| Marking Dell's Water-Based DPI-614 | Stained | >100, 37(4") | 13 | 2 |
| Marking Water-Based Example A | Not Stained | 83 | 79 | 80 |
| Marking Water-Based Example B | Not Stained | 99 | 78 | 96 |
| Marking Water-Based Urethane Marking | Stained | >100, 35(4") | 13 | 2 |

*Measured from 3" if not otherwise mentioned in a bracket.

Fresh and aged fluorescence values are shown in Table I. Automatic match mounting of tires currently requires fluorescence values greater than 30 Sick units. After only 5 days of aging at room temperature, fluorescence values of the commercial Dell DPI-613 (solvent based) and DPI-614 (water-based) fluorescent markings and the water-based urethane fluorescent marking deteriorated to unacceptable levels (see Table I) and are not recommended for further evaluations. Moreover, DPI-614 is based on organic solvents and is not approved for applications where the solvent could generate health and safety concerns. Control MPA and Bollin labels have good initial and aged fluorescence values well above requirements. However, these labels are not easily removed with a water wash. Fresh and aged fluorescence values are acceptable for the experimental markings of Example A and Example B. Since fluorescence values gradually deteriorate with time, higher initial fluorescence values may be required. This can possibly be achieved by using higher concentration of fluorescent pigments in the formulations and/or thicker coatings.

The liquid waterborne harmonic marking composition of Example B was examined after 8 months of aging at 23°±2° C.). The composition was homogeneous without sediment. When the aged liquid composition was applied to a cured black sidewall test piece, the dried marking had a fluorescence reading of 96 Sick units measured from 3 inches (7.6 cm) away. As shown in Table I the initial fluorescence reading of the unaged marking composition was 99 Sick units. Thus the liquid marking composition has good storage stability.

The coated test piece (i.e, dried waterborne fluorescent marking of Example B on a cured black sidewall composition) was also evaluated after 8 months aging as a dried coating at 23°±2° C. It had a fluorescence value of 55 Sick units after aging. It is believed that the reduction in fluorescence was due to migration of staining ingredients from the black sidewall to the newly developed harmonic marking film. Even though some reduction in fluorescence occurred over 8 months (99−55=44 Sick units) this coating retained acceptable fluorescence (e.g., greater than 30 Sick units) for 8 months indicating that the poly(vinyl alcohol) binder imparts significantly better retention of fluorescence than the commercially available fluorescent markings from Dell markings which had unacceptable fluorescence values after 5 days.

Fluorescent Marking on PVA-Based Paint

Fluorescent pigment/ink/dye were added to waterborne polyurethane dispersions and the results are shown in Table II. In Table II applicant used Sancure™ 776 an aliphatic waterborne polyurethane. While the waterborne urethane polymers are readily commercially available, they are not as effective at retaining fluorescence on a tire black sidewall as is the poly(vinyl alcohol) (see Table I). In some cases, an optical brightening agent was also added. The solution/dispersion were coated onto a tire white sidewall section containing blue protective paint use to protect new tire whitewalls during storage. The data in Table II illustrates the ability of fluorescent enhancers to improve fluorescence and illustrates a broader group of fluorescent pigments and dyes. A comparison of Examples 3 and 4 and Examples 5 and 6 illustrates the effect of optical brightening agents. Fluorescence was measured in Sick units and the results are shown in Table II.

TABLE II

| No. | Waterborne Polymer | Fluorescent Dye/Ink/Pigment from Day-Glo Color Corp. | Optical Brightening Agent | Fluorescence (Sick Units) |
|---|---|---|---|---|
| 1 | Sancure 776 | Yellow, Try 33 | None | 80 |
| 2 | Sancure 776 | Red AX-12-5 | None | 65 |
| 3 | Sancure 776 | Blue ZQ-19 | None | 9 |
| 4 | Sancure 776 | Blue ZQ-19 | Uvitex | >100 |
| 5 | Sancure 776 | Blue A19 | None | 84 |
| 6 | Sancure 776 | Blue A19 | Uvitex | >100 |

*Measured from 3" if not otherwise mentioned in a bracket.

Black tire sidewalls coated with a poly(vinyl alcohol) commercial white-sidewall protectorant composition available from H. B. Fuller were the substrates for Table III. The commercial protectorant is believed to be a blend of poly(vinyl acetate) and poly(vinyl alcohol) with the majority by weight being poly(vinyl acetate). EPX 13 (Glo-Sperse Rocket Red, a water-based fluorescent material available from Day-Glo Color Corporation) was applied. In another spot was applied EPX 17 (Glo-Sperse Saturn Yellow™, a water-based fluorescent material available from Day-Glo Color Corporation). At that time, the fluorescent reading was much higher than minimum requirement of 30 Sick units from 3" distance. The fluorescence readings were again taken after 8½ months aging and the results are as follows:

TABLE III

Aged Markings on PVA

| Black sidewall coated with PVA-based paint | Fluorescence after 8.5 months (Sick Units) |
|---|---|
| Glo-Sperse Rocket Red from Day-Glo, EPX 13 | >100, 65 (4") |
| Glo-Sperse Saturn Yellow from Day-Glo, EPX 17 | >100, 33 (4") |

*Measured from 3" if not otherwise mentioned in a bracket.

Table III illustrates that the fluorescent pigment or dye can be applied over a poly(vinyl alcohol) coating and exhibit sufficient fluorescence after aging for 8.5 months. The fluorescence reading was much higher than required (30 Sick units from 3" distance) even after 8½ months aging when EPX 13 (Glo-Sperse Rocket Red) and EPX 17 (Glo-Sperse Saturn Yellow) from Day-Glo Color Corporation were applied directly to black sidewall coated with PVA based protective paint. These examples illustrate that the fluorescent coating need not contain PVA if applied over a PVA or a PVA/PVAc protective coating.

Black sidewall test pieces having dimensions of 6"×6"×0.1" were the substrate for Table IV. A PVA commercial white-sidewall protectorant from H. B. Fuller was applied. On the top of the protectorant, Day-Glo's water-based fluorescent markings were applied. Fresh and aged (4 days) fluorescence readings were as follows:

TABLE IV

Fluorescent Markings on PVA Coated Black Sidewall

| Coating on Black Sidewall | Fresh Fluorescence (Sick) | 4-Day Aged Fluorescence (Sick) | Fluorescence after 15 Days (Sick) |
|---|---|---|---|
| Glo-Sperse Invisible Blue, EP594 | >100, 94 (4") | >100, 90 (4") | >100, 70 (4") |
| Glo-Sperse Saturn Yellow, EPX 17 | >100, >100 (4"), 56 (5") | >100, >100 (4"), 51 (5") | >100, >100 (4"), 56 (5") |
| Glo-Sperse Rocket Red, EPX 13 | >100, >100 (4"), 43 (5") | >100, >100 (4"), 42 (5") | >100, >100 (4") 41 (5") |

*Measured from 3" if not otherwise mentioned in a bracket.

White sidewall pieces having dimensions of 6"×6"×0.1" were the substrate for Table V. A PVA commercial white-sidewall protectorant from H. B. Fuller was applied to the substrates. On the top of the paint, Day-Glo's water-based fluorescent markings were applied. Fresh and aged (4 days) fluorescence readings were as follows:

TABLE V

Fluorescent Marking on PVA/PVAc Coated Whitewalls

| Coating on Black Sidewall | Fresh Fluorescence (Sick) | 4-Day Aged Fluorescence (Sick) | Fluorescence after 15 Days (Sick) |
|---|---|---|---|
| Glo-Sperse Invisible Blue, EP594 | >100, >100 (4"), 50 (5") | >100, 96 (4") | >10, 70 (4") |
| Glo-Sperse Saturn Yellow, EPX 17 | >100, >100 (4"), 55 (5") | >100, >100 (4"), 49 (5") | >100, >100– (4"), 56 (5") |
| Glo-Sperse Rocket Red, EPX 13 | >100, >100 (4"), 43 (5") | >100, >100 (4"), 39 (5") | >100, >100– (4"), 41 (5") |

*Measured from 3" if not otherwise mentioned in a bracket.

Table IV illustrates that good fluorescence values can be achieved over a poly(vinyl alcohol) coating on a black sidewall with a variety of fluorescent materials. Table V illustrates that the same fluorescence can be achieved over a poly(vinyl alcohol) coating on a white tire sidewall. When the PVA coating is present, additional binder is not needed to maintain fluorescence. However, the coating easily cracks on flexing (see below).

Thirty grams of PVA/PVAc commercial sidewall protectorant available from H. B. Fuller was used as a binder for the markings of Table VI. To this was added fluorescent material(s) to prepare compounded fluorescent markings 1–10. This PVA/PVAc containing markings were applied to black sidewall test pieces. Fresh, 4-day aged, and 15-day aged fluorescent readings were taken and they were as follows:

TABLE VI

Fluorescent PVA/PVAc Markings
Optionally With Optical Brightening Agents

| Marking No. | Ingredients Added to 30 g of PVA Paint | Fresh Fluorescence (Sick) | 4-Day Aged Fluorescence (Sick) | 15-Day Aged Fluorescence (Sick) |
|---|---|---|---|---|
| 1 | 1 g A-19 Horizon Blue | 64 | 54 | 62 |
| 2 | 0.5 g Uvitex OB | 34 | 36 | 34 |
| 3 | 1 g A-19 Horizon Blue + 0.5 g Uvitex OB | 66 | 64 | 77 |
| 4 | 2 g A-19 Horizon Blue + 0.5 g Uvitex OB | >100, 33 (4") | 83 | 92 |
| 5 | 1 g A-19 Horizon Blue + 1 g | 92 | 86 | 93 |

TABLE VI-continued

Fluorescent PVA/PVAc Markings
Optionally With Optical Brightening Agents

| Marking No. | Ingredients Added to 30 g of PVA Paint | Fresh Fluorescence (Sick) | 4-Day Aged Fluorescence (Sick) | 15-Day Aged Fluorescence (Sick) |
|---|---|---|---|---|
| | Uvitex OB | | | |
| 6 | 5.6 g Glo-Sperse Invisible Blue (EP594) | >100, 58 (4") | >100, 43 (4") | >100, 46(4") |
| 7 | 5.7 g Glo-Sperse Saturn Yellow EPX 17) | 98 | 83 | 90 |
| 8 | 5.6 g Glo-Sperse Invisible Blue EP 594 + 5.7 g Glo-Sperse Saturn Yellow (EPX 17) | >100, 60 (4") | >100, 62 (4") | >100, 63(4") |
| 9 | 16 g Glo Sperse Saturn Yellow (EPX 17) | >100, 59 (4") | >100, 47 (4") | >100,53(4") |
| 10 | 16 g Glo-Sperse Rocket Red (EPX 13) | 93 | 84 | 94 |
| 11 | None | 0 | 0 | 0 |

*Measured from 3" if not otherwise mentioned in a bracket.

Glo-Sperse Invisible Blue (EP594), Glo-Sperse Saturn Yellow (EPX 17) and Glo-Sperse Rocket Red (EPX 13) were water-based markings from Day-Glo Color Corporation. A-19 Horizon Blue was fluorescent blue powder from Day-Glo Color Corporation. Uvitex OB is a fluorescent whitening agent from Ciba-Geigy Corporation.

Table VI was added to illustrate the effect of different amounts of fluorescent compounds and optical brighteners on fluorescence values. The difference in fluorescence between markings 3 and 4 is attributed to more fluorescent compound. The small difference between marking 1 and 3 illustrates for whatever reason that the optical brightener had little effect.

Florescent markings of varying thickness on a black tire sidewall were evaluated for the effect of coating thickness on florescence. The marking was prepared by mixing 30 g of H. B. Fuller's PVA/PVAc based tire white sidewall based protective paint with 2 g of A-19 Horizon Blue pigment and 1 g of Uvitex OB (Ciba). Different wet coating thickness of this material was applied onto tire black sidewall test pieces and fluorescence was measured after drying. On a black tire sidewall the fluorescence generally increases with increasing thickness of coating. Results are as follows:

TABLE VII

| Wet Thickness (mil) | Fluorescence (Sick Units) |
|---|---|
| 4.0 | 23 |
| 9.5 | 35 |
| 18.0 | 41 |
| 20.0 | 47 |
| 32+ | 60 |

Four different fluorescent coatings were applied over a dried PVA/PVAc protective layer (6 mil wet thickness) to a black tire sidewall and to a white tire sidewall to study the effect of substrate color on fluorescence values. The four harmonic paints were coated (6 mil wet thickness) and then dried. Then fluorescence was measured and the results are shown in Table VIII.

TABLE VIII

Effect of Substrate Color on Fluorescence

| Paint | Fluorescence on Black Sidewall | Florescence on White Sidewall | Fluorescent Coating Integrity |
|---|---|---|---|
| Glo-Sperse Saturn Yellow, EPX 17 | 51 | >100, >100 (4"), 60 (5") | Cracked |
| Glo-Sperse Invisible Blue, EP594 | 99 | >100, >100 (4"), 53 (5") | Cracked |
| Glo-Sperse Rocket Red, EPX 13 | >100, 94 (4") | >100, >100 (4"), 52 (5") | Cracked |
| 5.6 Glo-Sperse Invisible Blue, EP594, + 5.7 g Glo-Sperse Saturn Yellow, EPX 17 + 30g PVA/PVAc | 52 | >100, >100 (4"), 66 (5") | No Cracking |

The fluorescence is significantly higher on white sidewall than on black sidewall. This is because the marking (paint) is somewhat translucent. Thus, incident radiation reflected from the substrate or an opaque intervening material (pigment or backing material) may increase the measured fluorescence. It was also noted that the fluorescent coatings (without a PVA/PVAc binder) cracked. The cracking is attributable to the lack of a sufficient amount of flexible binder in the first three commercial available coatings.

A water-soluble brightening agent, Tinopal™ SFP available from Ciba Additives, Ciba-Geigy Corporation in Hawthorne, N.Y. (4,4'-bis-2-diethylamino-4-(2,5-disulphophenylamino)-s-triazinyl-6-amino-stilbene-2,2'-disulphonic acid, sodium salt) was compared to the fluorescent materials in the following Table IX. In that Tinopal™ SFP is water-soluble rather than water dispersible it seems to form a smoother and more homogeneous wet marking. This brightening agent has more than enough fluorescence to be used alone as the fluorescent material. The wet coatings in Table IX were compounded with 30 g of a PVA/PVAc paint (H. B. Fuller) and applied as a 9.5 mil wet thickness coating.

TABLE IX

| Number | Ingredients Added to 30 g of PVA/PVAc Paint | 2-Day Aged Fluorescence (Sick) |
|---|---|---|
| 1 | 2 g A-19 Horizon Blue | 50 |
| 2 | 1 g Uvitex OB | 60 |
| 3 | 1 g Tinopal SFP | 93 |
| 4 | 2 g A-19 + 1 g Uvitex OB | 76 |
| 5 | 2 g A-19 + 1 g Tinopal SFP | >100, 42 (4") |
| 6 | 2 g A-19 + 1 g Uvitex OB + 1 g Tinopal SFP | >100, 53 (4") |
| 7 | 2 g ZQ19 Pigment* | 15 |
| 8 | 2 g ZQ19 + 1 g Uvitex OB | 35 |
| 9 | 2 g ZQ19 + 1 g Tinopal SFP | 82 |
| 10 | 2 g ZQ19 + 1 g Uvitex OB + 1 g Tinopal SFP | 95 |
| 11 | 0.5 g Uvitex OB | 27 |
| 12 | 0.5 g Tinopal | 86 |

*Available from Day-Glo Color Corporation.

While in accordance with the patent statutes the best mode and preferred embodiment has been set forth, the scope of the invention is not limited thereto, but rather by the scope of the attached claims.

What is claimed is:

1. A process for marking at least one sector on the surface of a tire to identify a location of a measurable variation in said tire that can be detected when the tire is rotated about its axis of rotation said process, comprising;
   a) measuring a variation in at least one sector of the tire,
   b) subsequently applying a water-based fluorescent marking composition to said sector of said tire to form a fluorescent coating thereon to mark the location of said variation, said fluorescent marking composition either including poly(vinyl alcohol) or being applied over a poly(vinyl alcohol) coating, and
   c) subsequently drying said fluorescent marking composition.

2. A process according to claim 1 including the steps of
   d) applying an energy source capable of generating fluorescent emissions from the fluorescent marking and
   e) locating said marking and said variation in said tire by detecting said fluorescent emissions.

3. A process according to claim 2, including the steps of
   f) marking at least one sector on a tire rim to identify the location of a measurable variation in said tire rim,
   g) mounting said tire on said tire rim with said rim or said tire or both being rotationally positioned with respect to each other to effect a reduction in the combined measured variations when said tire and rim are rotated.

4. A process according to claim 2, wherein said fluorescent coating is thereafter readily removable by washing the tire with water due to the water solubility of said fluorescent coating.

5. A process according to claim 3, wherein said measured variations include slight variations between sectors in the diameter of said tire and said rim when they are rotated about their axes.

6. A process according to claim 3, wherein said measured variations include slight variations in weight or weight distribution in one or more sectors of said tire and said rim.

7. A process according to claim 2, wherein said fluorescent coating includes at least 10 weight percent poly(vinyl alcohol) based on the dried coating weight and has sufficient fluorescence to be detectable by a fluorescence detector from a distance of 3 inches using a light source and a receiver.

8. A process according to claim 7, wherein said fluorescent coating has sufficient fluorescence to be detected after aging 8 months as a dried coating at 25°±5° C.

9. A process according to claim 8, wherein said fluorescent coating includes at least 10 weight percent poly(vinyl alcohol) and at least 10 weight percent poly(vinyl acetate) based on the dried fluorescent coating weight.

10. A process according to claim 1, wherein said fluorescent coating includes both poly(vinyl alcohol) and poly(vinyl acetate) or is applied to a coating including both poly(vinyl alcohol) and poly(vinyl acetate).

11. A process according to claim 1, wherein said fluorescent coating has at least 30 sick units of fluorescence detected at a distance of 3 inches after aging 8 months as a dried coating at 25°±5° C.

12. A process according to claim 11, wherein said marking includes an optical brightening agent.

13. A pneumatic tire having at least one sector marked with a fluorescent coating to facilitate assembly with other wheel components to minimize total variations in the wheel, said tire comprising
   a) a tire casing
   b) a tire sidewall
   c) a tire tread
   d) a fluorescent coating adhering directly to said tire, or adhered to a poly(vinyl alcohol) based coating which is adhered directly to said tire, said fluorescent coating identifying a sector that varies from the remainder of the tire, said fluorescent coating being derived from drying a water-based fluorescent coating composition and either including poly(vinyl alcohol) or being applied over a poly(vinyl alcohol) based coating.

14. A pneumatic tire according to claim 13, wherein said fluorescent coating includes poly(vinyl alcohol) and from about 1 to about 50 parts by weight of a fluorescent pigment or dye per 100 parts by weight of said coating in dry form.

15. A pneumatic tire according to claim 14, said fluorescent coating including at least 10 weight percent poly(vinyl alcohol) based on the dry coating weight.

16. A pneumatic tire according to claim 14, wherein said fluorescent coating composition is applied over a poly(vinyl alcohol) based protective coating or paint.

17. A pneumatic tire according to claim 13, wherein the fluorescent coating is comprised of a fluorescent pigment or dye, poly(vinyl alcohol), fillers and plasticizer and wherein at least 10 wt. % of the dry coating is poly(vinyl alcohol).

18. A pneumatic tire according to claim 17, wherein said fluorescent coating has at least 30 sick units of fluorescence after aging as a dried coating for 8 months at 25°±5° C. as detected by a fluorescence detector at a distance of 3 inches using a light source and a receiver.

19. A pneumatic tire according to claim 13, wherein at least 10 wt. % of the dry fluorescent coating is poly(vinyl alcohol) or said fluorescent coating is applied over a base coating containing at least 10 wt. % of poly(vinyl alcohol) or combinations thereof.

20. A pneumatic tire according to claim 13, wherein at least 5 wt. % of the dry fluorescent coating is poly(vinyl alcohol) and at least 20 wt. % of the dry fluorescent coating is poly(vinyl acetate).

* * * * *